United States Patent [19]
Task et al.

[11] Patent Number: 5,760,953
[45] Date of Patent: Jun. 2, 1998

[54] ADAPTOR FOR NIGHT VISION GOGGLES

[75] Inventors: Harry L. Task, Dayton; Peter L. Marasco, Kettering, both of Ohio

[73] Assignee: United States of America as represented by the Secretary of the Air Force, Washington, D.C.

[21] Appl. No.: 667,185

[22] Filed: Jun. 21, 1996

[51] Int. Cl.[6] ............................ G02B 23/00; G02B 7/02
[52] U.S. Cl. ............................................ 359/409; 359/827
[58] Field of Search ................................ 359/353, 400, 359/408, 409, 410, 421, 827; 2/10, 209.13

[56] References Cited

U.S. PATENT DOCUMENTS

| | | | |
|---|---|---|---|
| 5,000,556 | 3/1991 | Katsuma | 359/421 |
| 5,184,231 | 2/1993 | Ellis | 359/13 |
| 5,467,479 | 11/1995 | Mattes | 2/6.3 |
| 5,471,678 | 12/1995 | Dor | 2/6.7 |
| 5,617,257 | 4/1997 | Sheehy et al. | 359/818 |

Primary Examiner—Paul M. Dzierzynski
Assistant Examiner—Mark A. Robinson
Attorney, Agent, or Firm—Edward W. Nypaver; Thomas L. Kundert

[57] ABSTRACT

An adaptor detachably mounted on an ocular of night vision goggles for quickly adjusting the objective lens focus to clearly view far and near objects. The adaptor includes a positive optical power or close-up lens mounted in a holder pivotally mounted between a stowed, inoperative position and an operative position locating the close-up lens in axial alignment with the objective lens of the ocular. The close-up lens has an effective diameter substantially smaller than the diameter of the objective lens to raise the F/number of the objective lens/close-up lens combination for increasing the depth of focus for enhanced near viewing. Auxiliary illumination is provided by a battery powered infra-red Light Emitting Diode (LED) mounted in the adaptor and energized by a switch as the lens holder moves toward its operative position.

10 Claims, 5 Drawing Sheets

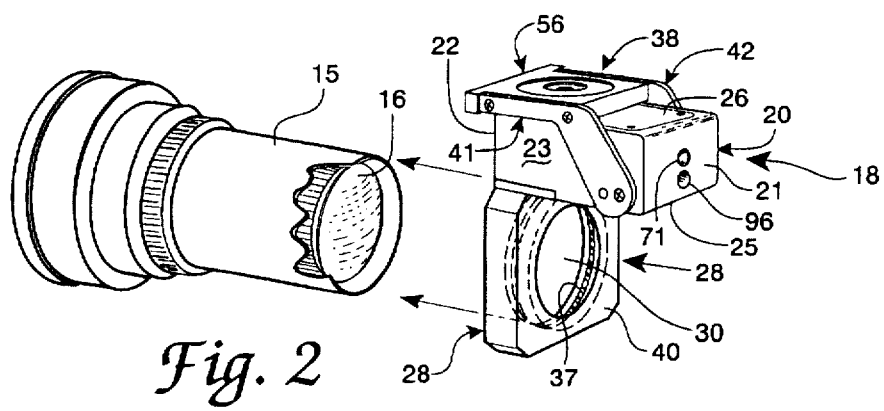
*Fig. 2*
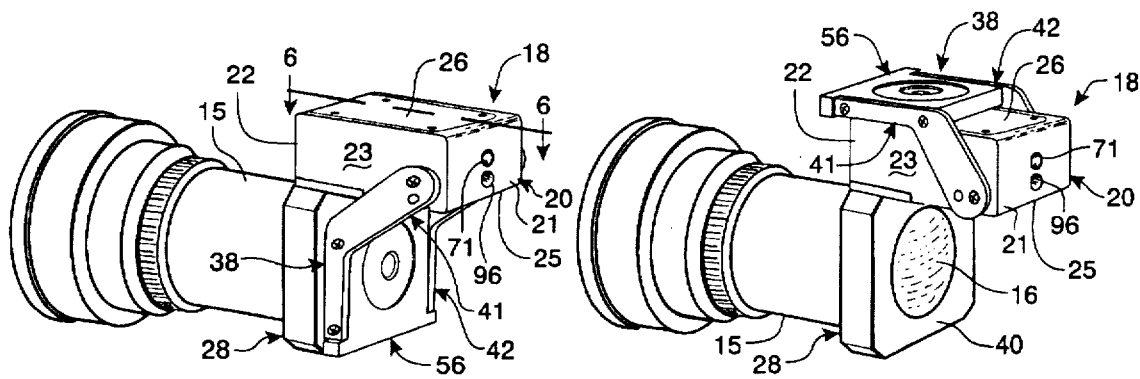
*Fig. 3a*
*Fig. 3b*

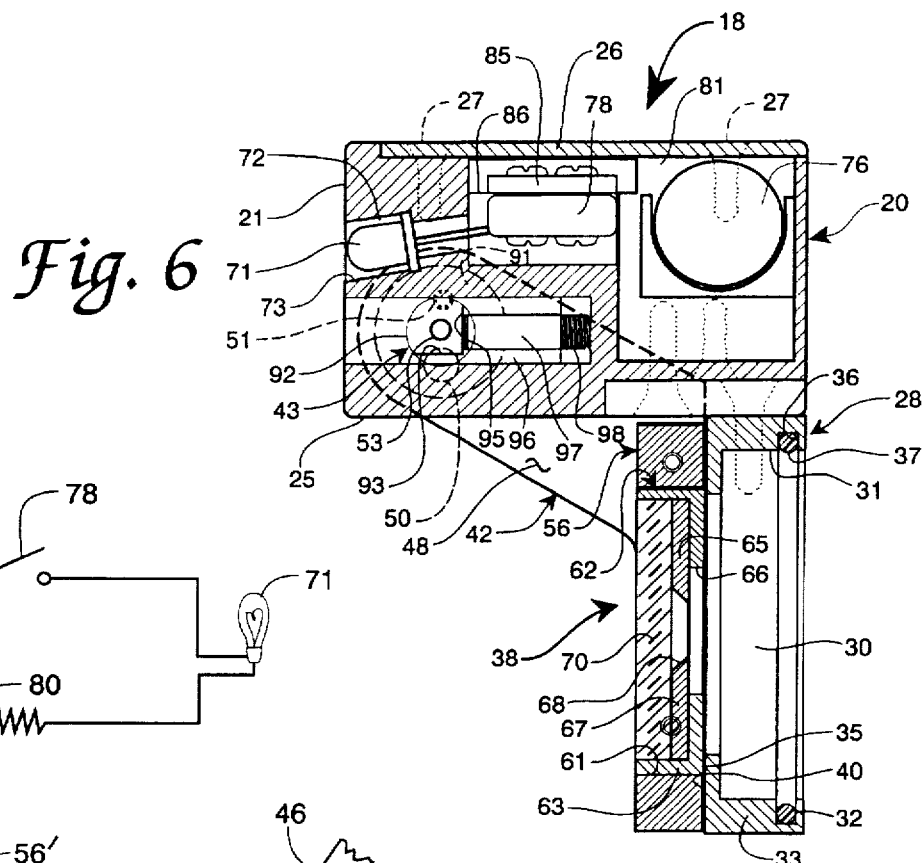
Fig. 6
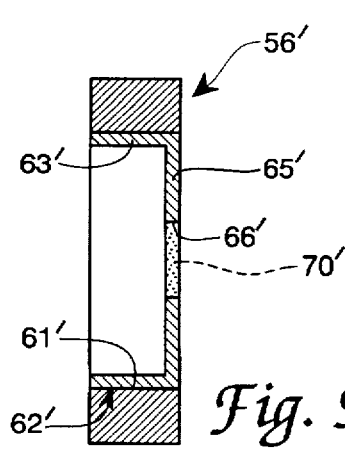
Fig. 7
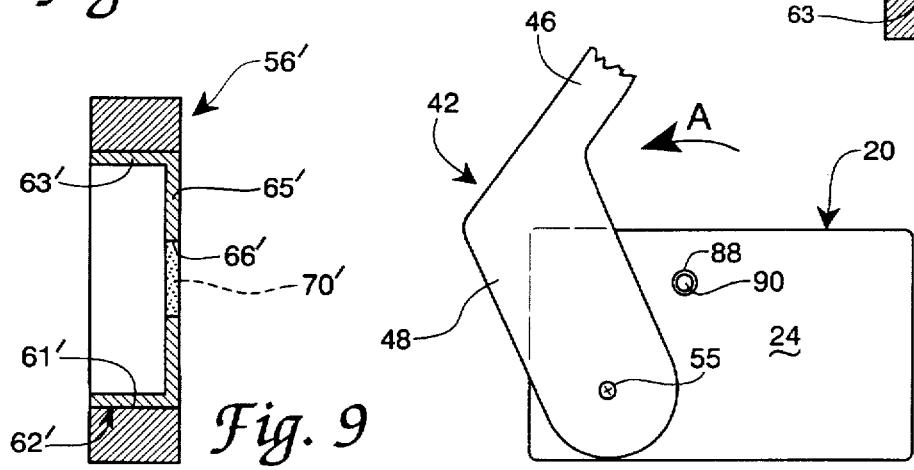
Fig. 9
Fig. 8

ADAPTOR FOR NIGHT VISION GOGGLES

RIGHTS OF THE GOVERNMENT

The invention described herein may be manufactured and used by or for the Government of the United States for all governmental purposes without the payment of any royalty.

BACKGROUND OF THE INVENTION

This invention relates generally to night vision equipment and, more particularly, to means for quickly adjusting the focus of night vision goggles.

Thousands of night vision goggles have been fielded in the United States and around the world for military and civilian night operation. Such goggles are used to facilitate viewing of nocturnal activities as well as activities that occur in places with minimal light. These night vision goggles are operable at very low light levels and capable of amplifying light as it reflects off objects rendering such objects sufficiently observable in the dark. The vast majority of known night vision goggles have an objective lens focusing mechanism including a manually operable ring rotatable for axially displacing the objective lens or lens assembly linearly in and out to focus on far and near objects, respectively. This requires a continuous rotating movement of the focusing ring by the wearer that must be precisely done until obtaining the desired focus for close objects because of the low F/number of the objective lens and the relatively small depth of focus. For certain applications of the night vision goggles, the wearer must frequently switch back and forth between viewing far objects and viewing near objects, respectively. A problem associated with such known focusing arrangements is the difficulty and arduous time consuming effort in accurately adjusting the objective lens to the precise axial location in order to obtain optimum focus. This problem is compounded in binocular night vision goggles since such manual adjustments must be made on both oculars.

SUMMARY OF THE INVENTION

Accordingly, it is an object of the present invention to avoid the deficiencies noted above by providing night vision goggles with an apparatus for easily and rapidly adjusting objective lens focus.

It is another object of this invention to provide the foregoing apparatus in the form of an adaptor readily attachable to an ocular of night vision goggles.

It is a further object of the present invention to provide in the foregoing adaptor a positive optical power or close-up lens pivotal between a stowed inoperative position and an operative position for viewing near view objects.

It is still another object of this invention to provide the foregoing adaptor with a source of increased illumination upon positioning the close-up lens in the operative position.

In accordance with the present invention, an adaptor detachably mounted on an ocular of night vision goggles is provided for quickly adjusting the objective lens focus to clearly view far and near objects. The adaptor includes a positive optical power or close-up lens mounted in a holder pivotally mounted between a stowed, inoperative position and an operative position locating the close-up lens in axial alignment with the objective lens of the ocular. The close-up lens has an effective diameter substantially smaller than the diameter of the objective lens to raise the F/number of the objective lens/close-up lens to increase the depth of focus for enhanced near viewing. Auxiliary illumination is provided by a battery powered infra-red Light Emitting Diode (LED) mounted in the adaptor and energized by a switch as the lens holder moves toward its operative position.

The foregoing and other objects, advantages and characterizing features of this invention will become clearly apparent from the ensuing detailed description of an illustrative embodiment thereof, taken together with the accompanying drawings wherein like reference numerals denote like parts throughout.

BRIEF DESCRIPTION OF THE DRAWING FIGURES

FIG. 2 is a perspective view of the adaptor of the present invention showing its relationship to an ocular of night vision goggles;

FIGS. 3a and 3b are perspective views of the adaptor shown attached to a night vision ocular in its operative and inoperative positions, respectively;

FIG. 6 is an enlarged sectional view taken along 6—6 of FIG. 3a;

FIG. 7 is a diagrammatic illustration of an electric circuit for use in the adaptor of this invention;

FIG. 8 is a fragmentary side view of the adaptor illustrating the means for actuating an electrical switch; and FIG. 9 is a sectional view of a lens holder illustrating another form of lens.

DETAILED DESCRIPTION OF THE INVENTION

Figure 1:
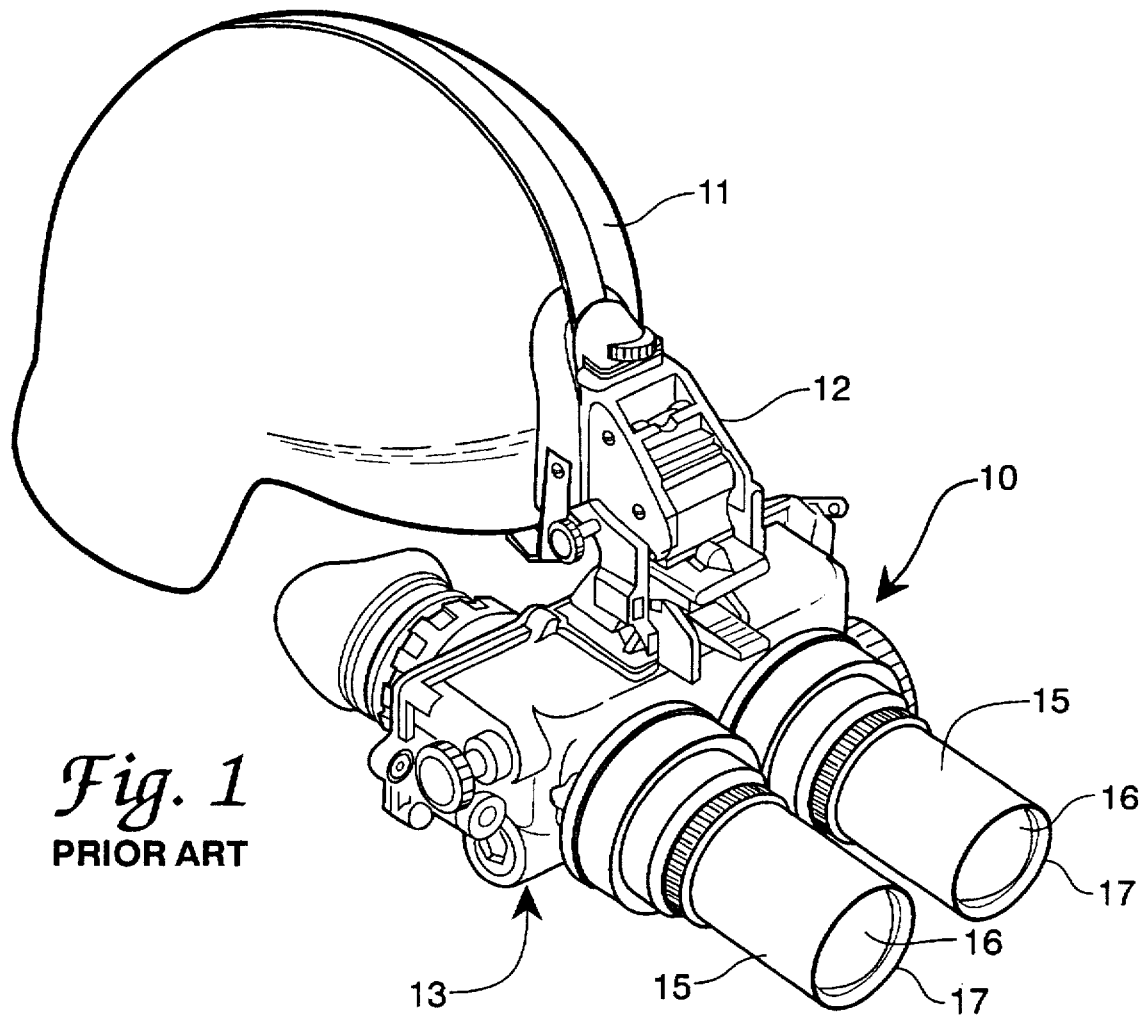
FIG. 1 is a perspective view of conventional night vision goggles to which the adaptor constructed in accordance with this invention can be attached.

Referring now in detail to the illustrative embodiment depicted in the accompanying drawings, there is shown in FIG. 1 a conventional or general purpose binocular night vision goggles, comprehensibly designated 10, secured to the helmet 11 of a user by a suitable pivotal mounting arrangement 12. The goggles 10 include a housing 13 for accommodating the usual optical system and image intensifier tube, not shown but well known in the art, and a pair of oculars 15 provided with objective lens 16 at the respective distal ends 17 thereof. The illustration of night vision goggles 10 is exemplary only and can be of any known prior art construction including a monocular arrangement having a single ocular only. Since the specifics of the night vision goggles 10 other than ocular 15 and objective lens 16 form no part of this invention, it is believed that no further description or showing of the details or particulars thereof is necessary.

Referring now to FIGS. 2–6, there is shown an adaptor, generally designated 18, constructed in accordance with this invention and adapted to be detachably mounted on the distal end 17 of each ocular 15. The adaptor 18 comprises a housing 20 having a front wall 21, a rear wall 22, side walls 23 and 24, a bottom wall 25, and a detachable top wall or plate 26 secured to the housing 20 by suitable fasteners 27. As used herein, the terms front, rear, top, bottom, vertical, horizontal and the like are applied only for convenience of description with reference to the drawings and should not be taken as limiting the scope of this invention.

Figure 4:
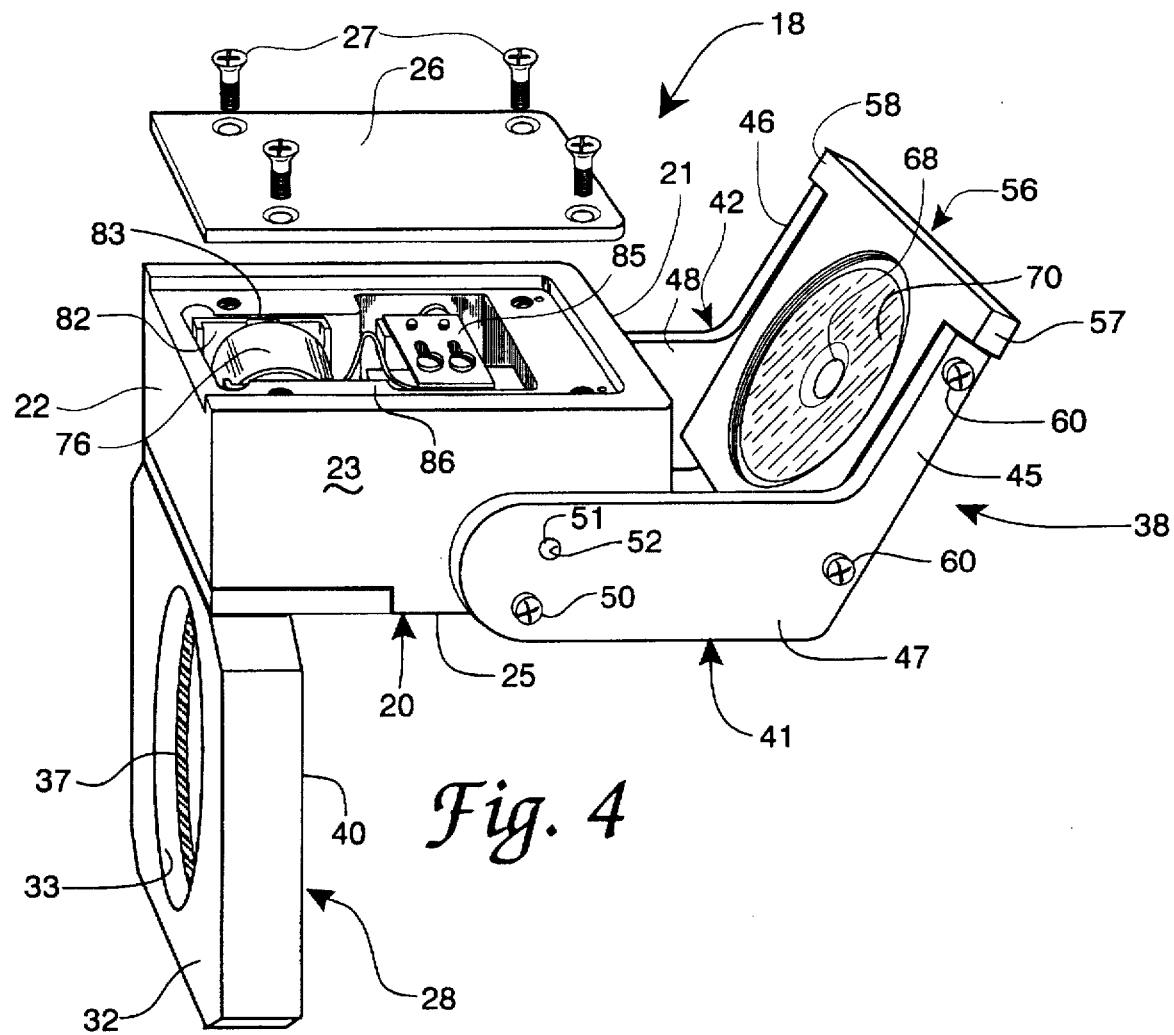
FIG. 4 is an enlarged perspective view of the adaptor shown with the top removed for clarity of description.
Figure 5:
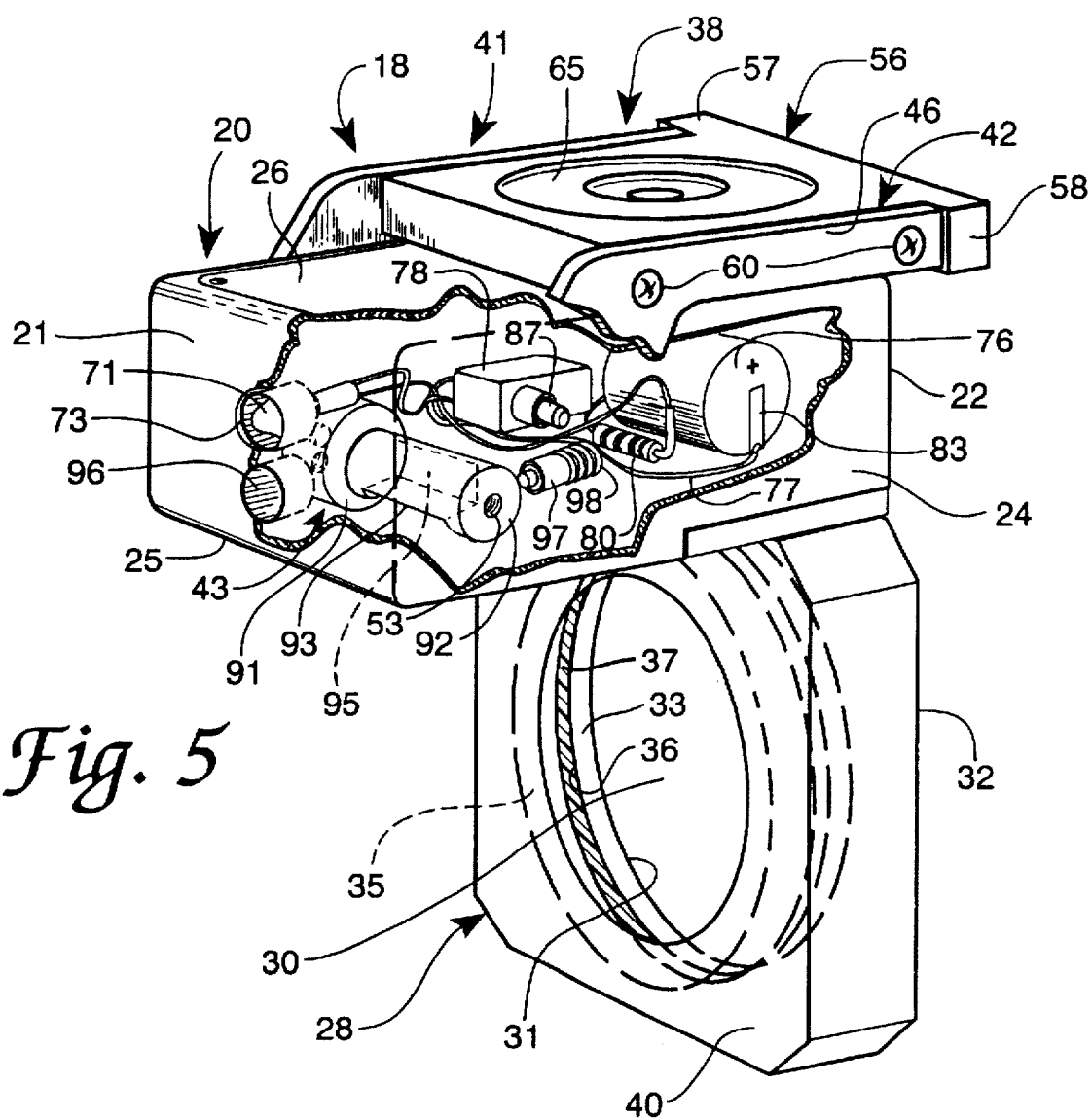
FIG. 5 is an enlarged perspective view showing the other side of the adaptor with a portion of the side wall cut-away for convenience of description.

As best shown in FIGS. 4–6, a vertical leg member 28 is fixedly secured to the housing bottom wall 25 at the rear end thereof and extends vertically downwardly therefrom. The member 28 is of a generally flat sided outline of substantially the same width as housing 20 and is provided with an axial bore 30 extending therethrough and an enlarged diameter opening 31 extending inwardly from the rear face 32 of member 28 for receiving the outer end portion of an ocular 15. Opening 31 is defined by a circumferential wall 33 configured for telescopic engagement about the periphery of ocular 15. The opening 31 terminates in an annular end wall 35 which serves as a seat for the distal end 17 of ocular 15. A circumferential groove 36 is provided in the wall 33 for receiving an O ring 37 to provide a friction fit between the end portion of ocular 15 and wall 33.

A pivotal member, generally designated 38, is mounted on housing 20 for pivotal movement between a stowed or inoperative position (FIG. 3b) and an operative position (FIG. 3a) in substantial abutting relation to the front face 40 of leg member 28. The member 38 comprises a pair of laterally spaced arms 41 and 42 mounted for pivotal movement in unison on opposite ends of a rotatable shaft 43 extending transversely through the housing 20. The arms 41 and 42 are formed with straight portions 45 and 46 and angularity related portions 47 and 48, respectively. Angular arm portion 47 is secured to one end of shaft 43 by a fastener 50 extending through portion 47 and threaded into a suitable tapped opening formed in the end face of the shaft 43. Also, a pin 51 integral with the end face of shaft 43 projects through an opening 52 in the arm portion 47 with a friction fit. The other end of the shaft 43 is formed with a tapped opening 53 (FIG. 5) at the center and rotational axis thereof for receiving a screw fastener 55 (FIG. 8) projecting through an opening in the other arm portion 48 and threaded into the tapped opening 53.

Detachably secured between arm portions 45 and 46 is a lens holder 56 of a generally square configuration in plan and having a thickness substantially equal to the width of arm portions 45 and 46. A pair of flanges 57 and 58 project laterally outwardly from one end of the holder 56 in overlying relation to the ends of arm portions 45 and 46. The side walls of lens holder 56 are provided with suitably spaced tapped openings for receiving screws 60 extending through suitable aligned openings in the arm straight portions 45 and 46 and threaded into the holder tapped openings.

As best shown in FIG. 6, the lens holder 56 is formed with a circular through opening 61 for accommodating with a friction fit a lens collar 62 having an annular wall 63 and a rear wall 65 provided with a circular opening 66. A flat, circular shroud or plate 67 is disposed within the collar 62 against the rear wall 65 thereof and is formed with a small aperture 68 which determines the diameter size of light passing therethrough. A positive optical power lens 70 of generally circular configuration in plan is fitted within the collar 62 against plate 67 and rigidly secured therein by any suitable means. The lens 70 will hereinafter sometimes be referred to as a positive or close-up or near viewing lens which provides near-field viewing of close objects as opposed to the objective lens 16 which is set for infinity to view far objects.

The size of aperture 68 determines the effective diameter of lens 70 and is significantly smaller than the diameter of the ocular objective lens 16, say on the order of 1 to 5 for example, to raise the F number by decreasing the clear aperture of the objective lens/close-up lens combination to increase the depth of focus and thereby provide a clearer view of close-up objects. It should be noted that any number of lens holders having differently sized lens apertures 68 can be selectively mounted between arms 41 and 42 to provide varied effective lens sizes, respectively, as determined by the range of short distances desired to be clearly focused for optimum viewing.

As an alternative if desired, a much smaller diameter sized lens can be employed in lieu of the enlarged diameter lens 70 and shroud 67 combination. As shown in FIG. 9, a close-up lens 70 of significantly smaller diameter than the objective lens 16 is fixedly secured in the opening 66' formed in the rear wall 65' of collar 62'. The same reference characters primed are used to identify similar parts shown in the embodiment of FIG. 6. Any number of lens holders 56 having different diameter sized lens 70' can be provided for selective mounting in the pivotal member 38 to provide a range of any near field distances desired for optimum viewing.

In the operative position of pivotal member 38 as shown in FIGS. 3a and 6 with the lens holder 56 in place against the front face 40 of member 28, the light entering night vision goggles 10 onto lens 70 is severely restricted through the reduced diameter aperture 68. In order to provide better near-field illumination, an infra-red Light Emitting Diode (LED) 71 is provided in a passageway 72 formed in the cast housing 20 and having an outlet 73 in housing front face 21 for emitting the increased auxiliary illumination provided by LED 71.

The LED 71 is incorporated in a simple circuit 75 (FIG. 7) and connected to a battery 76 via conductor 77 and a normally open switch 78. A suitable resistor 80 can be employed in the circuit to control the current directed to LED 71.

As best shown in FIGS. 4 and 6, battery 76 is located in a compartment 81 having opposite end brackets 82 (only one shown in FIG. 4) provided with suitable terminals 83. Access to battery 76 for replacement thereof can be had by detaching the housing top plate 26, which also provides access into the interior of housing 20.

The switch 78 is supported within housing 20 on a bracket 85 mounted on a ledge 86 forming a part of the housing 20. The switch 78 is actuated by a plunger 87 (FIG. 5) extending from the switch housing and spring biased outwardly through an opening 88 in the housing side wall 24. As shown in FIG. 8, the plunger 87 has a rounded head 90 projecting slightly outwardly of wall 24 and engagable by the inner side of arm portion 48 when in the stowed position shown in FIGS. 2 and 5. In this position, the plunger 87 is depressed against the spring bias to maintain switch 78 in the normally open position. As the arm portion 48 moves past the plunger head 90 in the direction of arrow A in FIG. 8 toward the operative position, movement of the plunger outwardly by its spring bias closes the switch 78 to complete a circuit for energizing LED 71 and increasing the illumination through outlet 73 for better viewing of near field objects.

Shaft 43 has an irregular configuration with an enlarged diameter portion 91 at the end that secures arm portion 43 and a reduced diameter portion 92 formed with two flat portions 93 and 95 spaced 90° apart for a purpose that will hereinafter become apparent. A cavity 96 is formed in the cast housing 20 for receiving a plunger 97 biased outwardly by a spring 98. The spring loaded plunger 97 engages the flat portions 93 and 95 to ensure the holder 56 has two stable positions, namely, the stowed position and the operative position, respectively. As the holder 56 is manually swung from the stowed position (FIG. 5) in a counterclockwise direction toward the operative position, plunger 97 rides off shaft flat portion 93 and engages the circumferential surface of the shaft portion 92 for approximately 180° and then engages flat portion 95 to slightly force the holder 56 into engagement against member 28 and maintain the holder 56 in such abutting relation.

In operation during a night activity, the user, such as a military person for example, would attach on adaptor 18 to each ocular 15 of the night vision goggles 10 secured to the user's helmet. Normally, the lens holder 56 would be disposed in an out-of-the-way, stowed position (FIG. 3b) for normal operation with the objective lens focus set for infinity to view far objects. When near viewing is desired or necessary, such as for reading maps, written notes, or viewing any close objects for example, the user simply flips the lens holder 56 downwardly towards its operative position. As the arm portion 48 swings past the plunger head 90, the plunger 87 is biased outwardly to close switch 78. This completes a circuit for energizing the infra-red LED 71 to provide covert, near-field illumination for clearly viewing any close objects. In order to revert back to viewing far objects, the user simply flips the lens holder 56 upwardly into its stowed position while simultaneously opening circuit 75 to cut off the auxiliary illumination provided by LED 71. This manual flipping procedure adjusts focusing instantaneously for selective viewing between far and near-field objects.

As a result of this invention, it is apparent that the present invention fully accomplishes its intended objects. The adaptor of this invention is used with night vision goggles to provide a simple arrangement for easily and rapidly adjusting objective lens focus for viewing between far and near objects. The adaptor includes a pivotal holder containing a near field viewing lens having an effective diameter significantly smaller than the diameter of the night vision goggles objective lens. In order to enhance near-field viewing through the restricted effective diameter of the near field viewing lens, a source of illumination is incorporated in the adaptor and is automatically energized upon pivoting the holder into near viewing position.

Illustrated embodiments of this invention having been disclosed in detail, it is to be understood that this has been done by way of illustration only and that numerous modifications may be made without departing from the broad spirit and scope of this invention.

We claim:

1. An adaptor for use with a night vision goggle assembly including at least one ocular having a distal end and an objective lens mounted in said ocular adjacent the distal end thereof comprising:

a housing detachably mounted on said distal end of said ocular, a pivotal member mounted on said housing for movement between a stowed position and an operative position, a positive lens mounted in said pivotal member, said positive lens having an effective viewing diameter substantially smaller than the viewing diameter of said objective lens, said positive lens in axial alignment with said objective lens upon disposition of said pivotal member in said operative position to significantly increase the focal depth of viewing.

2. An adaptor according to claim 1 including a shroud in said pivotal member forward of said positive lens and formed with a small aperture to define said effective viewing diameter of said positive lens.

3. An adaptor according to claim 1 including a lens holder detachably secured to said pivotal member, a collar mounted in said lens holder, said positive lens secured to said collar, a shroud mounted in said collar forward of said positive lens and having a small aperture therein in axial alignment with said positive lens.

4. An adaptor according to claim 1 wherein said positive lens has a diameter substantially smaller than the diameter of said objective lens.

5. An adaptor according to claim 1 including a lens holder detachably secured to said pivotal member and adapted to partially shroud said objective lens in the operative position of said pivotal member, said positive lens rigidly secured in said holder and having a diameter substantially smaller than the diameter of said objective lens.

6. An adaptor according to claim 1, including a leg member depending from said housing and having an opening therein conforming to the periphery of said ocular for attachment thereabout with a friction fit.

7. An adaptor for use with a night vision goggle assembly including at least one ocular having a distal end and an objective lens mounted in said ocular adjacent the distal end thereof comprising:

a housing detachably mounted on said distal end of said ocular, a pivotal member mounted on said housing for movement between a stowed position and an operative position, a positive lens mounted in said pivotal member, said positive lens having an effective viewing diameter substantially smaller than the viewing diameter of said objective lens, said positive lens in axial alignment with said objective lens upon disposition of said pivotal member in said operative position to significantly increase the focal depth of viewing, an auxiliary illumination means located in said housing for increasing the forward light intensity upon movement of said pivotal member toward said operative position, said illumination means incorporated in an electric circuit mounted in said housing and including a battery and a switch having a spring biased plunger disengagable from said pivotal member upon movement toward said operative position to close said switch for energizing said illumination means.

8. An adaptor for use with a night vision goggle assembly including at least one ocular having a distal end and an objective lens mounted in said ocular adjacent the distal end thereof comprising:

a housing detachably mounted on said distal end of said ocular, a pivotal member mounted on said housing for movement between a stowed position and an operative position, a positive lens mounted in said pivotal member, said positive lens having an effective viewing diameter substantially smaller than the viewing diameter of said objective lens, said positive lens in axial alignment with said objective lens upon disposition of said pivotal member in said operative position to significantly increase the focal depth of viewing, a shaft extending transversely through said housing and having adjacent flat portions, said pivotal member having laterally spaced arms secured to the opposite ends of said shaft, a spring loaded plunger mounted in said housing and biased against said shaft to engage said flat portions in said operative and stowed positions, respectively.

9. An adaptor for use with a night vision goggle assembly including at least one ocular having a distal end and an objective lens mounted in said ocular adjacent the distal end thereof comprising:

a housing detachably mounted on said distal end of said ocular, a pivotal member mounted on said housing for movement between a stowed position and an operative position, appositive lens mounted in said pivotal member, said positive lens having an effective viewing diameter substantially smaller than the viewing diameter of said objective lens, said positive lens in axial alignment with said objective lens upon disposition of said pivotal member in said operative position to significantly increase the focal depth of viewing, an auxiliary illumination means located in said housing for increasing the forward light intensity upon movement of said pivotal member toward said operative position.

10. An adaptor for use with a night vision goggle assembly including at least one ocular having a distal end and an objective lens mounted in said ocular adjacent the distal end thereof comprising:

a housing detachably mounted on said distal end of said ocular, a pivotal member mounted on said housing for movement between a stowed position and an operative position, a positive lens mounted in said pivotal member, said positive lens having an effective viewing diameter substantially smaller than the viewing diameter of said objective lens, said positive lens in axial alignment with said objective lens upon disposition of said pivotal member in said operative position to significantly increase the focal depth of viewing, an auxiliary illumination means located in said housing for increasing the forward light intensity upon movement of said pivotal member toward said operative position, said auxiliary illumination means comprising an infrared light emitting diode.

* * * * *